United States Patent
Tanimoto

(10) Patent No.: US 9,197,557 B2
(45) Date of Patent: Nov. 24, 2015

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 253 days.

(21) Appl. No.: 13/984,117

(22) PCT Filed: Dec. 8, 2011

(86) PCT No.: PCT/JP2011/006862
§ 371 (c)(1),
(2), (4) Date: Aug. 16, 2013

(87) PCT Pub. No.: WO2012/107983
PCT Pub. Date: Aug. 16, 2012

(65) Prior Publication Data
US 2013/0315249 A1 Nov. 28, 2013

(30) Foreign Application Priority Data
Feb. 8, 2011 (JP) .................................. 2011-025262

(51) Int. Cl.
*H04L 12/741* (2013.01)
*H04L 12/46* (2006.01)
*H04L 12/66* (2006.01)

(52) U.S. Cl.
CPC ............ *H04L 45/74* (2013.01); *H04L 12/4625* (2013.01); *H04L 12/4641* (2013.01); *H04L 12/66* (2013.01); *G06F 2213/0038* (2013.01)

(58) Field of Classification Search
None
See application file for complete search history.

(56) References Cited

U.S. PATENT DOCUMENTS

| | | | |
|---|---|---|---|
| 7,099,912 B2* | 8/2006 | Ishizaki et al. | 709/201 |
| 7,640,319 B1* | 12/2009 | Sylvain et al. | 709/218 |
| 2001/0050914 A1* | 12/2001 | Akahane et al. | 370/382 |
| 2004/0010712 A1* | 1/2004 | Hui et al. | 713/201 |
| 2004/0202171 A1* | 10/2004 | Hama | 370/395.1 |
| 2004/0255028 A1* | 12/2004 | Chu et al. | 709/227 |
| 2006/0104252 A1* | 5/2006 | Song et al. | 370/338 |
| 2006/0120374 A1* | 6/2006 | Yoshimoto et al. | 370/392 |
| 2006/0168279 A1* | 7/2006 | Lee et al. | 709/230 |
| 2008/0022391 A1* | 1/2008 | Sax et al. | 726/15 |
| 2009/0034546 A1* | 2/2009 | Nagata | 370/401 |
| 2010/0077204 A1* | 3/2010 | Kawano | 713/153 |
| 2013/0238813 A1* | 9/2013 | Tanimoto | 709/238 |
| 2013/0346487 A1* | 12/2013 | Tanimoto | 709/203 |
| 2014/0169373 A1* | 6/2014 | Tanimoto | 370/392 |

FOREIGN PATENT DOCUMENTS

JP 2002-217938 A 8/2002
JP 2008-154101 A 7/2008

OTHER PUBLICATIONS

Official Communication issued in International Patent Application No. PCT/JP2011/006862, mailed on Jan. 10, 2012.

\* cited by examiner

*Primary Examiner* — Ayaz Sheikh
*Assistant Examiner* — Tarell Hampton
(74) *Attorney, Agent, or Firm* — Keating & Bennett, LLP

(57) ABSTRACT

A relay server performs control to establish a routing session between the relay server and another routing relay server, control to establish a sub routing session between the relay server and a sub routing apparatus, and a packet forward control to forward a received packet via the routing session or the sub routing session. The packet forward control is such a control that, when a destination of a packet is associated with the sub routing apparatus of the relay server in a content stored in a sub address filter information storage unit, the packet is forwarded to the sub routing apparatus, while otherwise the packet is forwarded to the destination.

3 Claims, 14 Drawing Sheets

Fig.3

```
<?xml version="1.0" encoding="UTF-8" ?>
-<root>
   -<group id="group-a@relay-server-1.abc.net"            ⎤ 511
       lastmod="20090402133100" name="GROUP A">           ⎦
      <site id="relay-server-1@abc.net" rel="allow"/>     ⎤
      <site id="relay-server-2@abc.net" rel="allow"/>     ⎬ 512
      <site id="relay-server-3@abc.net" rel="allow"/>     ⎦
   </group>
</root>
```

Fig.4

```
<?xml version="1.0" encoding="UTF-8" ?>
-<root>
    -<site id="relay-server-1@abc.net"                                      ⎤ 521
        name="RELAY SERVER 1" stat="active">                                ⎦
       -<node  group="group-a@relay-server-1.abc.net"                       ⎤
          id="client-11@relay-server-1.abc.net"                             ⎬ 522
          name="CLIENT 11" site="relay-server-1@abc.net"/>                  ⎦
    </site>
    -<site id="relay-server-2@abc.net"                                      ⎤ 521
        name="RELAY SERVER 2" stat="active">                                ⎦
       -<node  group="group-a@relay-server-1.abc.net"                       ⎤
          id="client-21@relay-server-2.abc.net"                             ⎬ 522
          name="CLIENT 21" site="relay-server-2@abc.net"/>                  ⎦
    </site>
    -<site id="relay-server-3@abc.net"                                      ⎤ 521
        name="RELAY SERVER 3" stat="active">                                ⎦
       -<node  group="group-a@relay-server-1.abc.net"                       ⎤
          id="client-37@relay-server-3.abc.net"                             ⎬ 522
          name="CLIENT 37" site="relay-server-3@abc.net"/>                  ⎦
       -<node  group="group-a@relay-server-1.abc.net"                       ⎤
          id="client-39@relay-server-3.abc.net"                             ⎬ 522
          name="CLIENT 39" site="relay-server-3@abc.net"/>                  ⎦
    </site>
</root>
```

Fig.5A

```
<?xml version="1.0" encoding="UTF-8" ?>
-<root>
   -<node addr="192.168.11.111"
       group="group-a@relay-server-1.abc.net"
       id="client-11@relay-server-1.abc.net"
       name="CLIENT 11" pass="abc" port="5070">
   </node>
</root>
```

Fig.5B

```
<?xml version="1.0" encoding="UTF-8" ?>
-<root>
  -<node addr="192.168.22.121"
      group="group-a@relay-server-1.abc.net"
      id="client-21@relay-server-2.abc.net"
      name="CLIENT 21" pass="abc" port="5070">
    </node>
  </root>
```

Fig.5C

```
<?xml version="1.0" encoding="UTF-8" ?>
-<root>
  -<node addr="192.168.33.137"
      group="group-a@relay-server-1.abc.net"
      id="client-37@relay-server-3.abc.net"
      name="CLIENT 37" pass="abc" port="5070">
    </node>
  -<node addr="192.168.33.139"
      group="group-a@relay-server-1.abc.net"
      id="client-39@relay-server-3.abc.net"
      name="CLIENT 39" pass="abc" port="5070">
    </node>
  </root>
```

Fig.6A

```
<?xml version="1.0" encoding="UTF-8"?>
-<root>
    -<vnet group="group-a@relay-server-1.abc.net"             ⎫
        id="vpn-group-1@abc.net"                               ⎬ 541
        lastmod="20090410162500" name="VPN-GROUP 1">          ⎭
      <rp id="relay-server-1@abc.net"/>                       ⎱ 542
      <rp id="relay-server-3@abc.net"/>                       ⎰
      <ssn sp="relay-server-1@abc.net"                        ⎱ 543
          ep="relay-server-3@abc.net"/>                       ⎰
    </vnet>
  </root>
```

Fig.6B

```
<?xml version="1.0" encoding="UTF-8"?>
-<root>
    -<vnet group="group-a@relay-server-1.abc.net"             ⎫
        id="vpn-group-2@abc.net"                               ⎬ 541
        lastmod="20090420134500" name="VPN-GROUP 2">          ⎭
      <rp id="relay-server-2@abc.net"/>                       ⎱ 542
      <rp id="relay-server-3@abc.net"/>                       ⎰
      <ssn sp="relay-server-3@abc.net"                        ⎱ 543
          ep="relay-server-2@abc.net"/>                       ⎰
    </vnet>
  </root>
```

Fig.7A

| VPN-GROUP2 ||
|---|---|
| IDENTIFICATION INFORMATION OF VPN GROUP | IDENTIFICATION INFORMATION OF SUB ROUTING APPARATUS |
| vpn-group-2@abc.net | client-37@relay-server-3.abc.net |

Fig.7B

| VPN-GROUP2 ||
|---|---|
| IDENTIFICATION INFORMATION OF START POINT (SP) SIDE | IDENTIFICATION INFORMATION OF END POINT (EP) SIDE |
| relay-server-3@abc.net | client-37@relay-server-3.abc.net |

Fig.8A

| NAME OF ROUTING RELAY SERVER OR SUB ROUTING APPARATUS | NAME OF ROUTING OBJECT DEVICE |
|---|---|
| RELAY SERVER 1 | COMMUNICATION APPARATUS 11 |
| RELAY SERVER 2 | COMMUNICATION APPARATUS 22 |
| | COMMUNICATION APPARATUS 23 |
| RELAY SERVER 3 | FILE SERVER 31 |
| CLIENT TERMINAL 37 | FILE SERVER 38 |

Fig.8B

| IDENTIFICATION INFORMATION OF ROUTING RELAY SERVER OR SUB ROUTING APPARATUS | IP ADDRESS OF ROUTING OBJECT DEVICE |
|---|---|
| relay-server-1@abc.net | 192.168.11.112 |
| relay-server-2@abc.net | 192.168.22.122 |
| | 192.168.22.123 |
| relay-server-3@abc.net | 192.168.33.131 |
| client-37@relay-server-3.abc.net | 192.168.34.138 |

Fig.9

| VPN-GROUP2 | | |
|---|---|---|
| IDENTIFICATION INFORMATION OF ROUTING RELAY SERVER | IP ADDRESS OF ROUTING OBJECT DEVICE | NAME OF ROUTING OBJECT DEVICE |
| relay-server-2@abc.net | 192.168.22.122 | COMMUNICATION APPARATUS 22 |
| | 192.168.22.123 | COMMUNICATION APPARATUS 23 |
| relay-server-3@abc.net | 192.168.33.131 | FILE SERVER 31 |
| | 192.168.34.138 | FILE SERVER 38 |

Fig.10

| VPN-GROUP2 | | |
|---|---|---|
| IDENTIFICATION INFORMATION OF SUB ROUTING APPARATUS | IP ADDRESS OF ROUTING OBJECT DEVICE | NAME OF ROUTING OBJECT DEVICE |
| client-37@relay-server-3.abc.net | 192.168.34.138 | FILE SERVER 38 |

RELAY SERVER AND RELAY COMMUNICATION SYSTEM

BACKGROUND OF THE INVENTION

1. Field of the Invention

The present invention relates to a relay server and more specifically to a relay server that enables communication to be performed between terminals connected to different LANs (Local Area Networks).

2. Description of the Related Art

Conventionally, a communication technology called a virtual private network (Virtual Private Network, VPN) has been known (for example, see Japanese Patent Application Laid-Open No. 2002-217938). The VPN is used for, for example, performing communication via Internet between terminals that are connected to LANs of a plurality of branch offices (stations) each located in each regions. Use of the VPN enables another LAN located in a distant place to be used as if it is a directly-connected network.

In this type of system, a configuration is known in which a relay server stores, not only identification information and an IP address of a terminal within a LAN to which the relay server itself is connected, but also identification information and an IP address of a terminal that is connected to another LAN, and performs communication based on a content thus stored. In this configuration, in a case where a large number of terminals are connected to each LAN, the relay server stores an enormous amount of information. Additionally, in this configuration, in a case where terminals connected to the LANs are frequently changed, the relay servers have to exchange information each time a change occurs. This makes the process troublesome, and causes an enormous amount of information to be exchanged between the relay servers.

SUMMARY OF THE INVENTION

Preferred embodiments of the present invention provide a relay server that is able to build a VPN without expanding the amount of information stored and the amount of information transmitted and received, even when a network is complicated.

Problems which can be solved by preferred embodiments of the present invention are as described above, and next, specific preferred embodiments of the present invention which solve the problems and effects thereof will be described.

In a first preferred embodiment of the present invention, a relay server includes a relay group information storage unit, a relay server information storage unit, a VPN group information storage unit, a sub VPN group information storage unit, an address filter information storage unit, a sub address filter information storage unit, and a communication control unit. The relay group information storage unit is arranged to store relay group information concerning a relay group including another relay server that is mutually connectable with the relay server. The relay server information storage unit stores relay server information including relay server start-up information, client terminal start-up information, and client terminal registration information, the relay server start-up information concerning the relay server belonging to the relay group, the client terminal start-up information and the client terminal registration information concerning a client terminal that belongs to the relay server belonging to the relay group. The VPN group information storage unit relates to a VPN group including routing relay servers that are the relay servers being set as routing points among the relay servers included in a relay communication system based on the relay group information and the relay server information, the VPN group being configured to perform communication in a virtual private network via a routing session established among the routing relay servers, the VPN group information storage unit stores identification information of the routing relay servers included in the VPN group and routing session information indicating the routing relay servers that are connected to one another. The sub VPN group information storage unit stores sub VPN group information that includes sub routing point information indicating a sub routing apparatus of the relay server, where the sub routing apparatus of a certain relay server represents a client terminal that is set as a sub routing point among client terminals belonging to the certain relay server. The address filter information storage unit stores address filter information concerning the routing relay server and address filter information concerning the sub routing apparatus of the routing relay server in association with identification information of the routing relay server, where the address filter information concerning a certain routing relay server or a certain sub routing apparatus represents information indicating an address of a routing object device that is designatable as a forwarding destination to which the certain routing relay server or the certain sub routing apparatus is able to forward a packet. The sub address filter information storage unit stores address filter information concerning the sub routing apparatus of the relay server in association with identification information of the sub routing apparatus. The communication control unit is arranged and programmed to perform a control to establish a routing session between the relay server and the routing relay server; a control to establish a sub routing session between the relay server and the sub routing apparatus of the relay server; and a packet forward control to forward a received packet via the routing session or the sub routing session. The packet forward control is a control which, in a case where a destination of a packet received via the routing session is associated with the relay server in a content stored in the address filter information storage unit, or in a case where the destination of the packet is associated with the sub routing apparatus of the relay server in a content stored in the sub address filter information storage unit, the packet is forwarded to the sub routing apparatus, otherwise the packet is forwarded to the destination.

This enables the relay server to build a VPN with another routing relay server selected from the other relay servers included in the relay communication system and, for example, share a file only with a necessary relay server. The above-described configuration can simplify the VPN group information as compared with a VPN in which a client terminal in addition to a relay server functions as a routing point. Moreover, in the address filter information storage unit, the address filter information concerning a sub routing apparatus is stored not in association with identification information of this sub routing apparatus but in association with identification information of the routing relay server. Accordingly, even in a network including a large number of sub routing points, complication of the content stored in the address filter information storage unit can be significantly reduced or prevented. This significantly reduces the amount of information stored in the relay server. Furthermore, in a case of synchronizing the information with another routing relay server, the amount of information exchanged between the routing relay servers is significantly reduced or prevented.

Preferably, the relay server is configured as follows. When an instruction to set the client terminal belonging to the relay server as a sub routing point as well as an instruction to start a virtual private network is received from the client terminal, the communication control unit is arranged and programmed to perform a control to add the client terminal having instructed to start the virtual private network to the sub VPN group information; a control to transmit the address filter information concerning the client terminal to another routing relay server; and a control to establish the sub routing session between the relay server and the client terminal.

Accordingly, it is easy to make a setting such that the client terminal having instructed to start the VPN functions as a sub routing point.

In the relay server according to a preferred embodiment of the present invention, it is preferable that the sub routing point is changeable while the virtual private network is maintained. This makes it possible to build a VPN capable of flexibly dealing with a change in a status.

In a second preferred embodiment of the present invention, a relay communication system having the following configuration is provided. The relay communication system includes a plurality of relay servers and client terminals. The client terminals are connectable with each other via the relay servers. The relay server includes a relay group information storage unit, a relay server information storage unit, a VPN group information storage unit, a sub VPN group information storage unit, an address filter information storage unit, a sub address filter information storage unit, and a communication control unit. The relay group information storage unit stores relay group information concerning a relay group including another relay server that is mutually connectable with the relay server. The relay server information storage unit stores relay server information including relay server start-up information, client terminal start-up information, and client terminal registration information, the relay server start-up information concerning the relay server belonging to the relay group, the client terminal start-up information and the client terminal registration information concerning a client terminal. The VPN group information storage unit relates to a VPN group including routing relay servers that are the relay servers being set as routing points among the relay servers, the VPN group being configured to perform communication in a virtual private network via a routing session established among the routing relay servers, the VPN group information storage unit stores identification information of the routing relay servers included in the VPN group and routing session information indicating the routing relay servers that are connected to one another. The sub VPN group information storage unit stores sub VPN group information that includes sub routing point information indicating a sub routing apparatus of the relay server, where the sub routing apparatus of the relay server represents the client terminal that is set as a sub routing point among client terminals belonging to the relay server. The address filter information storage unit stores address filter information concerning the routing relay server and address filter information concerning the sub routing apparatus of the routing relay server in association with identification information of the routing relay server, where the address filter information concerning a certain routing relay server or a certain sub routing apparatus represents information indicating an address of a routing object device that is designatable as a forwarding destination to which the certain routing relay server or the certain sub routing apparatus is able to forward a packet. The sub address filter information storage unit stores address filter information concerning the sub routing apparatus of the relay server in association with identification information of the sub routing apparatus. The communication control unit is arranged and programmed to perform a control to establish a routing session with another routing relay server; a control to establish a sub routing session between the relay server and the sub routing apparatus; and a packet forward control to forward a received packet via the routing session or the sub routing session. The packet forward control is a control which, in a case where a destination of a packet received via the routing session is associated with the relay server in a content stored in the address filter information storage unit, or in a case where the destination of the packet is associated with the sub routing apparatus of the relay server in a content stored in the sub address filter information storage unit, the packet is forwarded to the sub routing apparatus, otherwise the packet is forwarded to the destination.

This configuration enables a VPN to be built with use of the routing relay server selected from the relay servers, and therefore file sharing or the like can be made only with a necessary relay server. The above-described configuration simplifies the VPN group information as compared with a VPN in which a client terminal in addition to a relay server functions as a routing point. Moreover, in the address filter information storage unit, the address filter information concerning a client terminal included in the sub VPN group is stored not in association with identification information of this client terminal but in association with identification information of the routing relay server. Accordingly, even in a network including a large number of sub routing points, complication of the content stored in the address filter information storage unit is significantly reduced or prevented. This significantly reduces the amount of information stored in the relay server. Furthermore, a relay communication system can be built in which the amount of information exchanged between the routing relay servers in a case of synchronizing the information with another routing relay server is significantly reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram showing a content of relay group information according to a preferred embodiment of the present invention.

FIG. 4 is a diagram showing a content of relay server information according to a preferred embodiment of the present invention.

FIGS. 5A-5C are diagrams showing content of client terminal information according to a preferred embodiment of the present invention.

FIGS. 6A and 6B are diagrams showing content of VPN group information according to a preferred embodiment of the present invention.

FIGS. 7A and 7B are diagrams showing content of sub VPN group information according to a preferred embodiment of the present invention.

FIGS. 8A and 8B are diagrams explaining address filter information according to a preferred embodiment of the present invention.

FIG. 9 is a diagram showing a content stored in an address filter information storage unit according to a preferred embodiment of the present invention.

FIG. 10 is a diagram showing a content stored in a sub address filter information storage unit according to a preferred embodiment of the present invention.

DETAILED DESCRIPTION OF THE PREFERRED EMBODIMENTS

Figure 1:
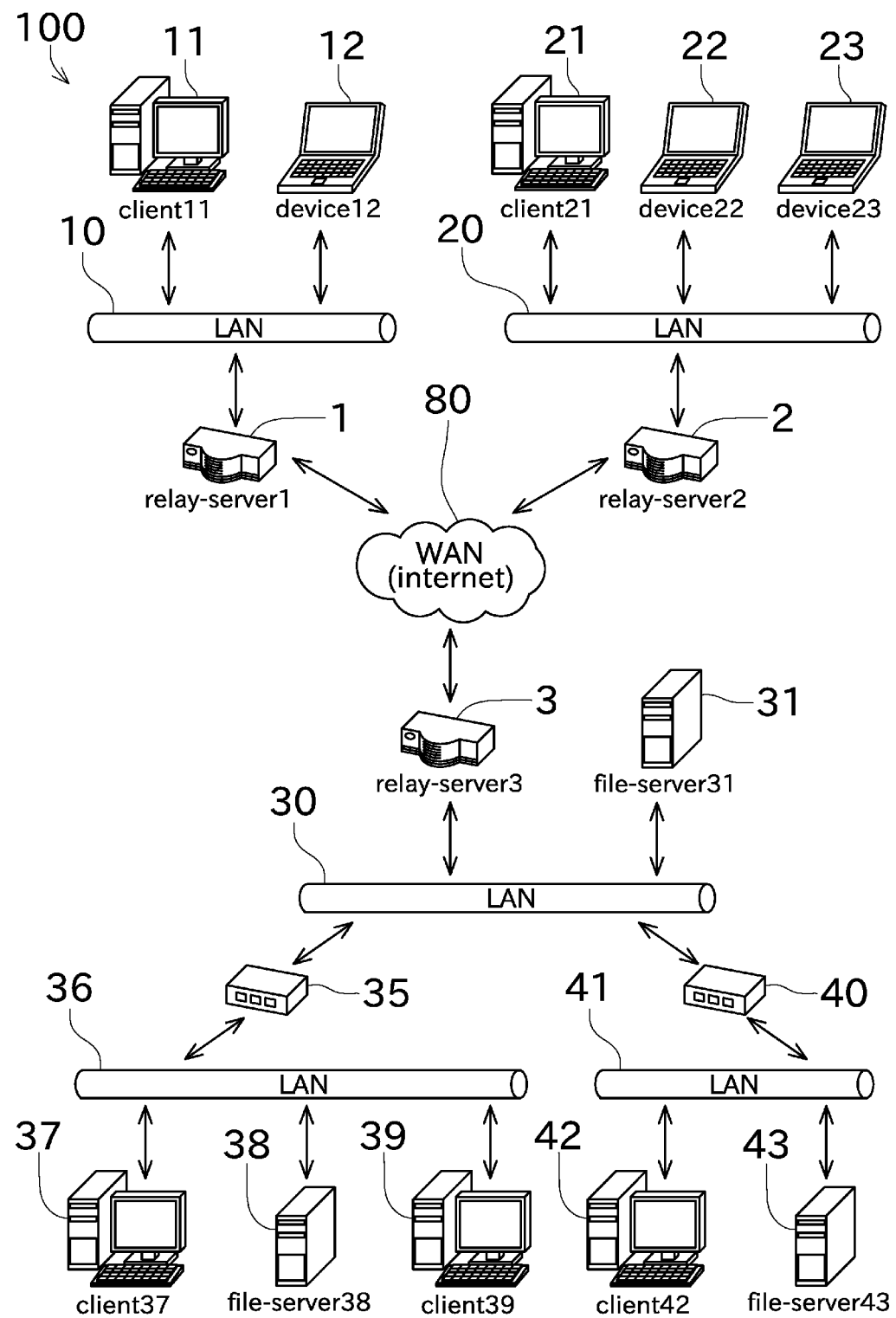
FIG. 1 is a diagram illustrating an overall configuration of a relay communication system according to a preferred embodiment of the present invention.

Next, preferred embodiments of the present invention will be described with reference to the drawings. Firstly, with reference to FIG. 1, an outline of a relay communication system 100 according to a preferred embodiment of the present invention will be described. FIG. 1 is an explanatory diagram showing an overall configuration of a relay communication system 100 according to one preferred embodiment of the present invention.

As shown in FIG. 1, the relay communication system 100 preferably includes a plurality of LANs 10, 20, 30, and the like, that are connected to a Wide Area Network (WAN, wide area communication network) 80. Each of the LANs 10, 20, and 30 preferably is a relatively small network built in a limited place or in physically remote spaces. In this preferred embodiment, the Internet is preferably used as the WAN 80, for example.

In the following, a specific description will be given to each LAN. As shown in FIG. 1, a relay server 1, a client terminal 11, and a communication apparatus 12 are preferably connected to the LAN 10. A relay server 2, a client terminal 21, a communication apparatus 22, and a communication apparatus 23 are preferably connected to the LAN 20. A file server 31 is preferably connected to the LAN 30. Also, another LAN 36 is preferably connected to the LAN 30 via a router 35. A client terminal 37, a file server 38, and a client terminal 39 are preferably connected to the LAN 36. Moreover, still another LAN 41 is preferably connected to the LAN 30 via a router 40. A client terminal 42 and a file server 43 are preferably connected to the LAN 41.

Each of the relay servers 1, 2, and 3 is preferably connected not only to each of the LANs 10, 20, and 30 but also to the WAN 80, and therefore able to communicate not only with the client terminal connected to the same LAN but also with the relay servers connected to the other LANs. Accordingly, not only a global IP address but also a private IP address is preferably given to each of the relay servers 1, 2, and 3.

The client terminals 11, 21, 37, 39, and 42 are, for example, preferably configured as personal computers, which are able to communicate with one another via the relay servers 1, 2, and 3. The communication apparatuses 12, 22, and 23 are, for example, preferably configured as personal computers, which are able to transmit packets, via the LANs to which the communication apparatuses 12, 22, and 23 themselves are connected, to the terminals connected to the corresponding LANs. The file servers 31, 38, and 43 are, for example, preferably configured as network attached storages, which are able to transmit packets, via the LANs to which the file servers 31, 38, and 43 themselves are connected, to the terminals connected to the corresponding LANs.

Figure 2:
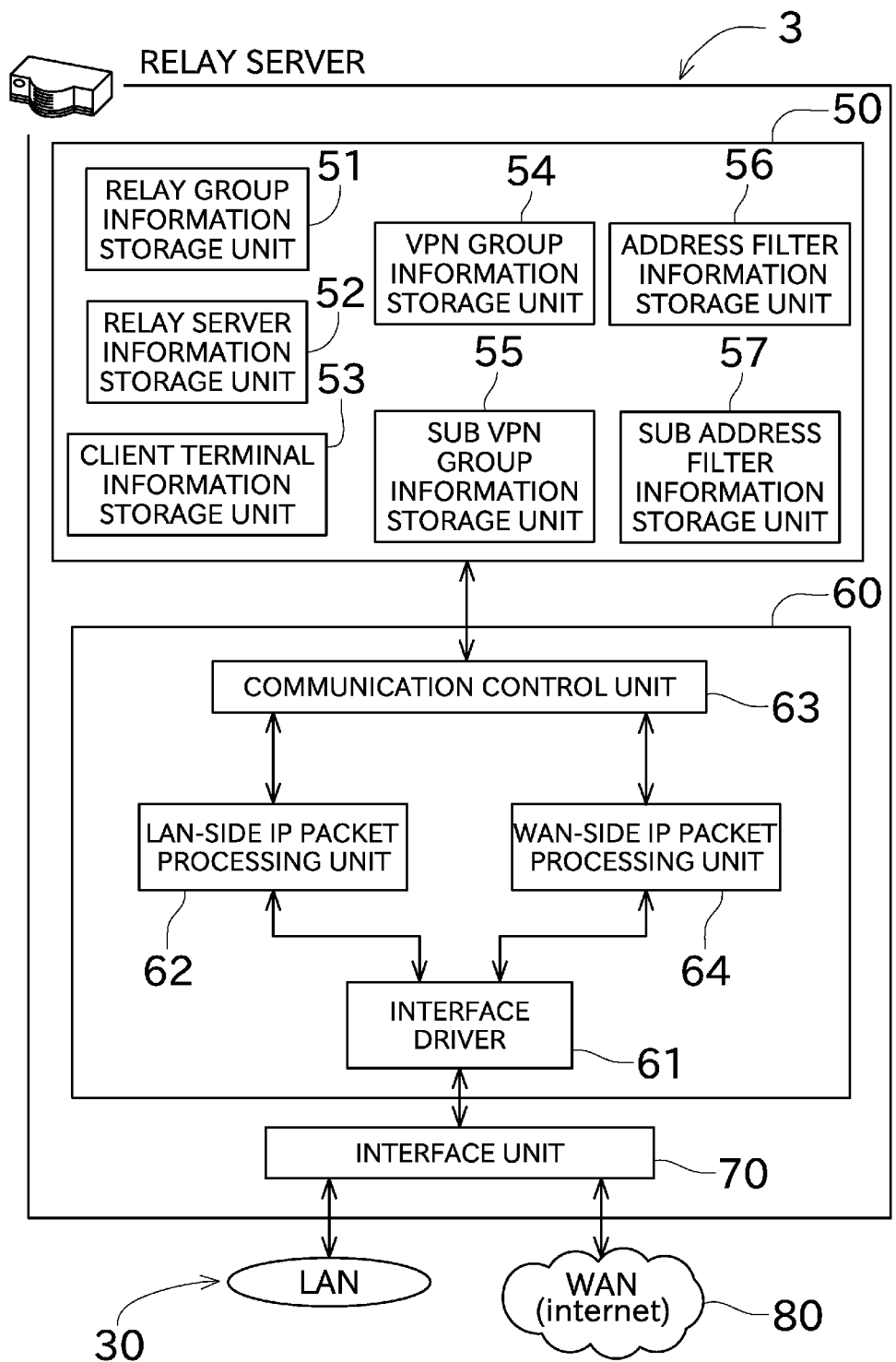
FIG. 2 is a functional block diagram of a relay server according to a preferred embodiment of the present invention.

Next, the relay servers 1, 2, and 3 will be described. These three relay servers preferably have the same or substantially the same configuration except for a portion of the contents stored therein. Therefore, the relay server 3 will be described as a representative. Firstly, a configuration included in the relay server 3 will be described with reference to FIG. 2. FIG. 2 is a function block diagram of the relay server 3.

As shown in FIG. 2, the relay server 3 preferably includes a storage unit 50, a control unit 60, and an interface unit 70.

The interface unit 70 is able to communicate with the terminals connected to the LAN 30 and the LAN 36 by using the private IP address. The interface unit 70 is also capable of communication through the WAN 80 by using the global IP address.

The control unit 60 is, for example, preferably a CPU with control and computation functions, and able to execute various kinds of processing based on a program read out from the storage unit 50. The control unit 60 is preferably able to control various kinds of communication in accordance with a protocol such as, for example, TCP/IP, UDP, or SIP. As shown in FIG. 2, the control unit 60 includes an interface driver 61, a LAN-side IP packet processing unit 62, a communication control unit 63, and a WAN-side IP packet processing unit 64.

The interface driver 61 is preferably driver software that controls the interface unit 70. The LAN-side IP packet processing unit 62 performs an appropriate process on a packet received from the LAN 30, and outputs a resultant to the communication control unit 63. The WAN-side IP packet processing unit 64 performs an appropriate process on a packet received from the WAN 80, and outputs a resultant to the communication control unit 63.

The communication control unit 63 is arranged and programmed to determine a destination of the received packet based on information indicated by the packet and information stored in the storage unit 50, and to transmit the packet to the determined destination. The communication control unit 63 is able to update a content stored in the storage unit 50 based on information received from another terminal.

The storage unit 50 preferably is, for example, configured as a hard disk or a non-volatile RAM, and able to store various types of data. The storage unit 50 preferably includes a relay group information storage unit 51, a relay server information storage unit 52, a client terminal information storage unit 53, a VPN group information storage unit 54, a sub VPN group information storage unit 55, an address filter information storage unit 56, and a sub address filter information storage unit 57. Hereinafter, a content stored in the storage unit 50 will be described with reference to FIGS. 3 to 10. FIG. 3 is a diagram showing a content of relay group information. FIG. 4 is a diagram showing a content of relay server information. FIGS. 5A-5C are diagrams showing content of client terminal information. FIGS. 6A and 6B are diagrams showing content of VPN group information. FIGS. 7A and 7B are diagrams showing content of sub VPN group information. FIG. 8 is a diagram for explaining address filter information. FIG. 9 is a diagram showing a content stored in the address filter information storage unit 56. FIG. 10 is a diagram showing a content stored in the sub address filter information storage unit 57.

The relay group information storage unit 51 stores relay group information indicating a relay group and a relay server that forms this relay group.

As shown in FIG. 3, in the relay group information, a group tag and site tags that are child elements whose parent element is the group tag are described. In the group tag, group information 511 concerning a relay group is described. As the group information 511, identification information ("id") of the relay group, a last modification time ("lastmod"), and a name ("name") of the relay group, are preferably described. In the site tags, group configuration information 512 concerning relay servers that define the relay group is described. In the group configuration information 512, identification information ("id") of these relay servers is described. An additional relay group can be provided. In such a case, a new relay group is given unique identification information different from those of the other relay groups. This enables such setting that, for example, data exchange is performed only within a specific relay group.

The relay group information is shared among the relay servers 1, 2, and 3 that define this relay group. In a case where a certain relay server performs a process of changing the relay group, it is transmitted to the other relay servers and the relay group information is updated. In this manner, the relay group information is dynamically shared.

The relay server information storage unit 52 stores relay server information indicating an outline of a relay server that performs relay communication and a client terminal that belongs to this relay server.

In the relay server information shown in FIG. 4, site tags each described for each relay server, and node tags that are child elements whose parent elements are the site tags, are described. In the site tag, server information 521 concerning the relay server 1 is described. As the server information 521, identification information ("id") of the relay server, a name ("name") of the relay server, and start-up information ("stat"), are described. The stat being "active" indicates that the relay server logs in to the relay communication system 100, and the stat being blank indicates that the relay server is logging off. In the node tag that is the child element of the site tag, belonging information 522 indicating a client terminal belonging to the relay server is described. As the belonging information 522, a name ("group") of the relay group to which a client terminal belongs, identification information ("id") of the client terminal, a name ("name") of the client terminal, and identification information ("site") of the relay server that is a login destination, are described. When the client terminal does not log in to the relay server (relay communication system 100), the "site" is blank.

Communication by the relay group is performed based on the above-described relay group information and relay server information, in the following manner. For example, in a case where a packet is transmitted from the client terminal 11 to the client terminal 21, the client terminal 11 firstly transmits a packet to the relay server 1 that is the relay server to which the client terminal 11 itself is connected. Here, a relay server capable of a packet exchange can be recognized based on the above-described relay group information, and the identification information of a client terminal belonging to the relay server, and whether or not the client terminal is connected, can be found based on the above-described relay server information. Based on such information, the relay server 1 transmits the packet to the relay server 2 that is the relay server to which the client terminal 21 is connected. Then, the relay server 2 transmits the packet to the client terminal 21. Thereby, relay communication can be performed between client terminals 11 and 21.

Similarly to the relay group information, the relay server information is also shared among the relay servers 1, 2, and 3 included in this relay group. In a case where a certain relay server performs a process of changing the relay server information, it is transmitted to the other relay servers and the relay server information is updated. In this manner, the relay server information is dynamically shared.

The client terminal information storage unit 53 stores client terminal information that is detailed information concerning a client terminal. Each of the relay servers 1, 2, and 3 stores the client terminal information concerning only the client terminal belonging to specific one of the relay servers 1, 2 and 3. For example, since the client terminal 11 belongs to the relay server 1 as shown in FIG. 1, the client terminal information storage unit 53 included in the relay server 1 stores only the client terminal information of the client terminal 11.

The client terminal information stored in the client terminal information storage unit 53 of the relay server 1 is shown in FIG. 5A. Likewise, the client terminal information stored in the relay server 2 is shown in FIG. 5B, and the client terminal information stored in the relay server 3 is shown in FIG. 5C.

In the client terminal information shown in FIGS. 5A-5C, a node tag is described. In the node tag, a private IP address ("addr") of a client terminal, a name ("group") of a relay group to which the client terminal belongs, identification information ("id"), a name ("name"), a passcode ("pass") for logging in to a relay server, and port information ("port"), are described.

The VPN group information storage unit 54 stores VPN group information that is information concerning a VPN group including relay servers (hereinafter, referred to as routing relay servers) selected from relay servers that form a relay group. The VPN group is a group formed within the relay group. Establishing a routing session among routing relay servers can build a virtual network (VPN).

It is possible to provide a plurality of VPN groups within one relay group. In this preferred embodiment of the present invention, it is assumed that a VPN group (VPN-GROUP1) including the relay server 1 and the relay server 3 and a VPN group (VPN-GROUP2) including the relay server 2 and the relay server 3 are provided. The VPN group information concerning VPN-GROUP1 is shown in FIG. 6A, and the VPN group information concerning VPN-GROUP2 is shown in FIG. 6B.

In the VPN group information, a vnet tag is described. In the vnet tag, VPN group basic information 541, routing point information 542, and routing session information 543, are described. In the VPN group basic information 541, a name ("group") of a relay group to which a VPN group belongs, identification information ("id") of the VPN group, a last modification time ("lastmod"), and a name ("name") of the VPN group, are described. In the routing point information 542, identification information of routing relay servers that perform routing at a time of performing communication among VPN groups is described. In the routing session information 543, the routing relay servers connected to one another in the VPN group are described. In the routing session information 543, the routing relay servers are defined such that they are classified into the side ("sp (start point)") that takes initiative to perform a communication control and the side ("ep (end point)") that receives the communication control during a routing session establishment process to start a VPN in the VPN group. In the following description, the routing relay server in the side that takes initiative to perform the communication control to establish the routing session may be sometimes referred to as "start point", and the routing relay server in the side that receives the communication control may be sometimes referred to as an "end point".

The VPN group information is shared among the relay servers included in the VPN group. More specifically, the VPN group information concerning VPN-GROUP1 is preferably shared between the relay server 1 and the relay server 3, and the VPN group information concerning VPN-GROUP2 is shared between the relay server 2 and the relay server 3. In a case where a certain relay server performs a process to change the VPN group information, it is transmitted to the other relay servers included in the VPN group, and the VPN group information is updated. In this manner, the VPN group information is dynamically shared. A process to provide the VPN group will be described later.

The sub VPN group information storage unit 55 stores information (sub VPN group information) concerning a sub VPN group including one or more client terminals (hereinafter, referred to as sub routing apparatuses) that are, among the client terminals belonging to the relay server 3, set as sub routing points. Establishing a routing session among the routing relay servers and then establishing a routing session between the sub routing apparatus and the relay server 3 enables the sub routing apparatus to behave as if it is a routing point. Either different client terminals or the same client terminal may be set as the sub routing points in the respective VPN groups. In the following description, particularly, the routing session formed between the routing relay server and the sub routing apparatus may be sometimes called a "sub routing session".

To be specific, the sub VPN group information storage unit 55 stores sub routing point information and sub routing session information with respect to each of the VPN groups. FIG. 7A shows sub routing point information corresponding to VPN-GROUP2. As shown in FIG. 7A, the sub routing point information describes a list of the identification information of the sub routing apparatus. FIG. 7B shows sub routing session information corresponding to VPN-GROUP2. As shown in FIG. 7B, the sub routing session information stores the identification information of an apparatus in the side (start point side) that takes initiative to perform the communication control, in association with the identification information of an apparatus in the side (endpoint side) that receives the communication control during the sub routing session established between the routing relay server and the sub routing apparatus.

The sub VPN group information described above is shared between the routing relay server and the sub routing apparatus. However, the sub VPN group information is not shared among the routing relay servers. Thus, in the routing relay server, only the sub VPN group information of the routing relay server self is stored in the sub VPN group information storage unit 55, and the sub VPN group information of the other relay servers (routing relay servers) is not stored therein.

Next, a description will be given to the address filter information and the contents stored in the address filter information storage unit 56 and in the sub address filter information storage unit 57. The address filter information is information indicating an address of a routing object device that can be designated as a forwarding destination to which a packet should be forwarded. This designation is made by a certain apparatus to an apparatus (the routing relay server or the sub routing apparatus) that performs the forwarding of the packet. In the following description, information indicating an address of a routing object device to which the routing relay server (or the sub routing apparatus) can forward a packet will be called address filter information concerning the routing relay server (or the sub routing apparatus).

FIGS. 8A and 8B show the routing relay server and the like in association with the address filter information concerning this routing relay server and the like. As shown in FIGS. 8A and 8B, for example, the relay server 1 is able to forward a packet to the communication apparatus 12.

As shown in FIG. 9, the address filter information storage unit 56 stores the address filter information concerning the routing relay server and the address filter information concerning the sub routing apparatus, in association with the identification information of this routing relay server. Thus, in the address filter information storage unit 56, the address filter information concerning the client terminal 37 is also preferably stored in association with the identification information of the relay server 3 (not this client terminal 37). The address filter information storage unit 56 stores not only the IP address of the routing object device, but also the name of this routing object device. Any name can be set as the name of the routing object device. For example, the name can be set in consideration of a type of the apparatus (a processor, a communication apparatus, a file server, and the like) and a place where the apparatus is arranged. This enables the routing object device serving as the destination to which the packet is forwarded to be managed in an easily recognizable manner. The relay server serving as each routing point is configured to display this address filter information on an external display device or the like.

As shown in FIG. 10, the sub address filter information storage unit 57 stores the address filter information concerning the sub routing apparatus (client terminal 37), in association with the identification information of this sub routing apparatus (client terminal 37). Thus, the content stored in the sub address filter information storage unit 57 and the content stored in the address filter information storage unit 56 are different in terms of the apparatus (identification information) associated with the address filter information. Additionally, the sub address filter information storage unit 57 stores only the address filter information concerning the sub routing apparatus of its own device (relay server 3), and does not store the address filter information concerning the sub routing apparatuses of the other routing relay servers. Accordingly, the content stored in the sub address filter information storage unit 57 is not shared among the routing relay servers, and the content stored therein is unique to each relay server.

At a time of starting the VPN, the routing relay server preferably notifies the other routing relay servers of the address filter information concerning this routing relay server and the address filter information concerning the sub routing apparatus. The routing relay server having received the notification updates the content stored in the address filter information storage unit 56 based on a content thus notified (however, the content stored in the sub address filter information storage unit 57 is not updated).

The relay server 3 is configured in the above-described manner. As described above, the contents stored in the sub VPN group information storage unit 55 and in the sub address filter information storage unit 57 include only the content concerning the relay server 3, and is not synchronized with the other relay servers. This can prevent expansion of the content stored in each relay server. The relay servers 1 and 2 preferably include the storage units 50 and the control units 60 having the same or substantially the same configurations as those of the relay server 3, though a detailed description is omitted herein.

Next, a description will be given to a process to build the VPN group and performing routing of a packet in the built VPN group in accordance with a preferred embodiment of the present invention.

Figure 11:
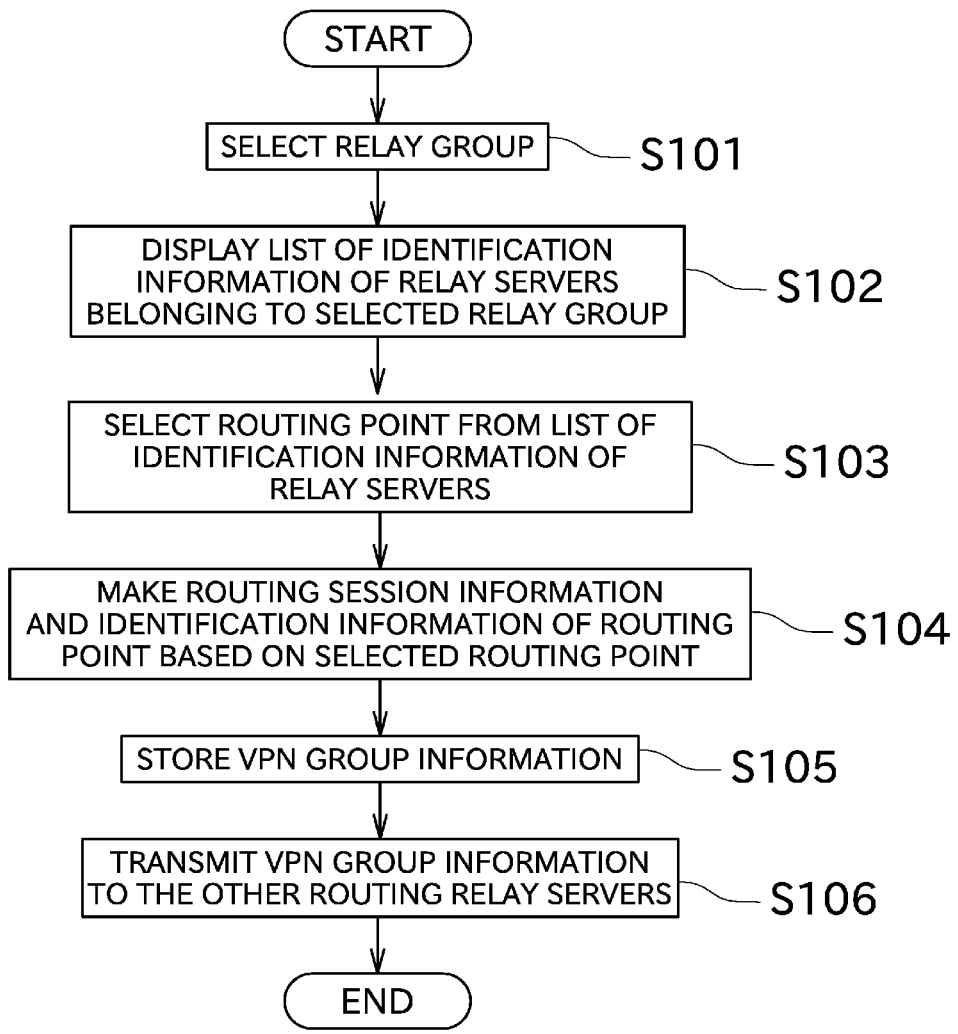
FIG. 11 is a flowchart showing a process of making a VPN group according to a preferred embodiment of the present invention.
Figure 12:
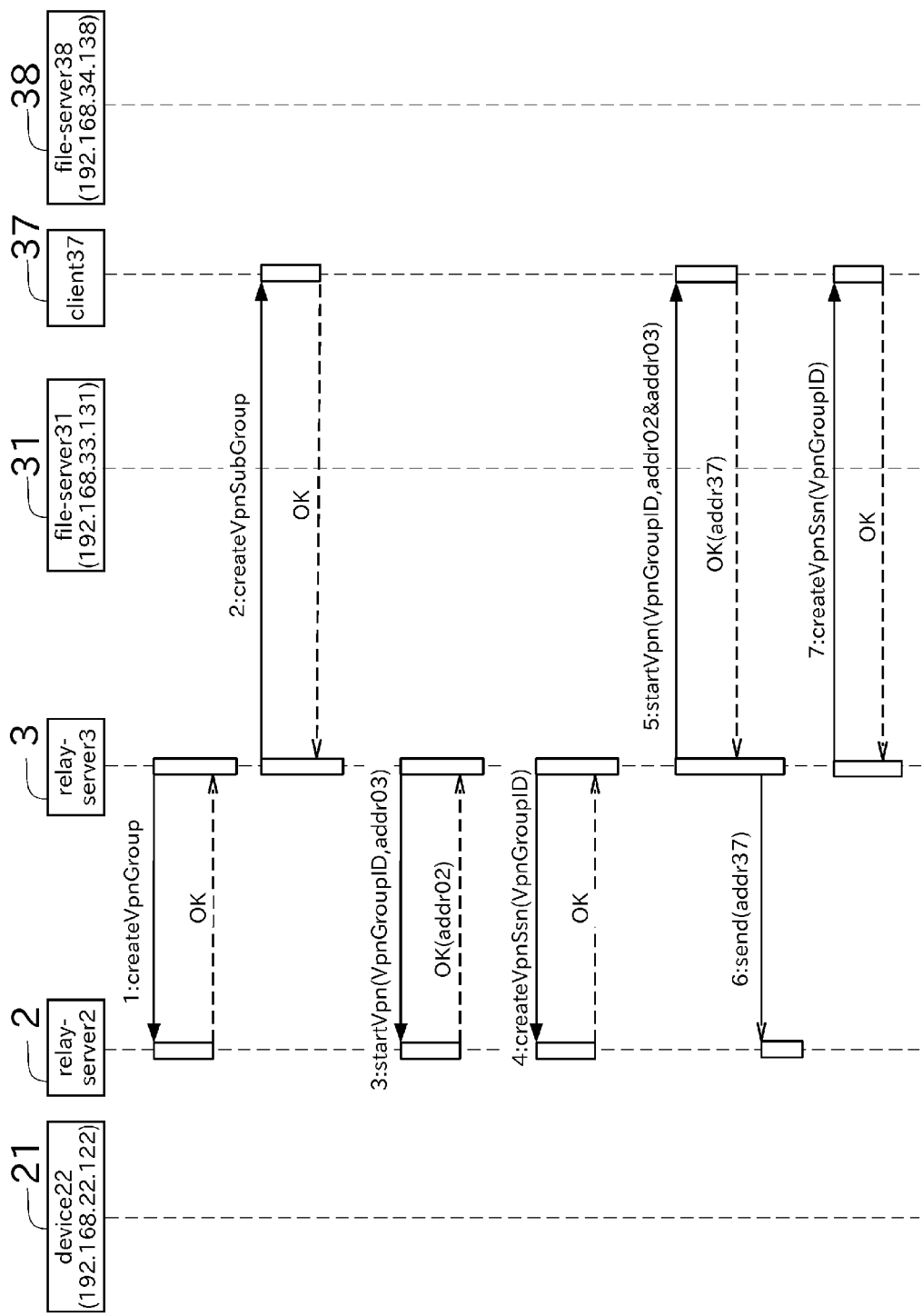
FIG. 12 is a sequence diagram showing a communication process making a VPN group and starting a VPN according to a preferred embodiment of the present invention.

Firstly, a flow of building the VPN group in accordance with a preferred embodiment of the present invention will be described with reference to FIGS. 11 and 12. FIG. 11 is a flowchart showing a process to provide the VPN group. FIG. 11 is a flowchart showing a process to provide the VPN group. FIG. 12 is a sequence diagram showing a communication process to provide the VPN group and starting the VPN.

A user using the relay communication system 100 logs in to the relay server 3 from, for example, the client terminal 39, and thus can display a VPN group setting screen on a display of the client terminal 39. Here, a case of logging in to the relay server 3 via the client terminal 39 and building the VPN group will be described. In the setting screen displayed on the client terminal 39, a plurality of relay groups to which the relay server 3 belongs are displayed. The user selects, from the plurality of relay groups, a relay group in which he/she desires to build a VPN group (S101).

After a relay group is selected, a list of identification information of relay servers that belong to the selected relay group and are able to function as routing points, is displayed on the client terminal 39 (S102). Then, the user selects the identification information of the relay server that is to function as the routing point in the VPN group to be built (S103). In the case described herein, it is assumed that the identification information of the relay server 2, in addition to the identification information of the relay server 3 that is currently logging in, is selected by the user.

Then, the routing session information is made based on the selected routing points (S104). The identification information of the routing points is also made based on the identification information of the selected relay server and the like (S104). Identification information of the VPN group, and the like, are added to these information thus made, and thereby the VPN group information shown in FIG. 6B is made. The VPN group information storage unit 54 stores this VPN group information (S105).

Then, the VPN group information thus made is transmitted to the other routing relay servers (relay server 2) (S106; Sequence Number 1: createVpnGroup in FIG. 12), and provides a notification that the VPN group has been formed.

Then, the user makes a sub VPN group corresponding to the VPN group thus made. More specifically, the user first displays, on the client terminal 39, a list of client terminals belonging to the relay server 3 that is currently logging in. Then, the user selects, from the displayed client terminals, a client terminal to function as the sub routing point. The relay server 3 makes the sub routing point information and the sub routing session information based on the selected information, and stores them in the sub VPN group information storage unit 55. Then, the relay server 3 transmits, to the selected client terminal, a notification that this client terminal has been selected as the sub routing point as well as the identification information of the VPN group (Sequence Number 2: createVpnSubGroup). Herein, it is assumed that the client terminal 37 is selected as the sub routing point of the relay server 3 in the VPN-GROUP2. As a result, a process to build the sub VPN group is completed.

Figure 13:
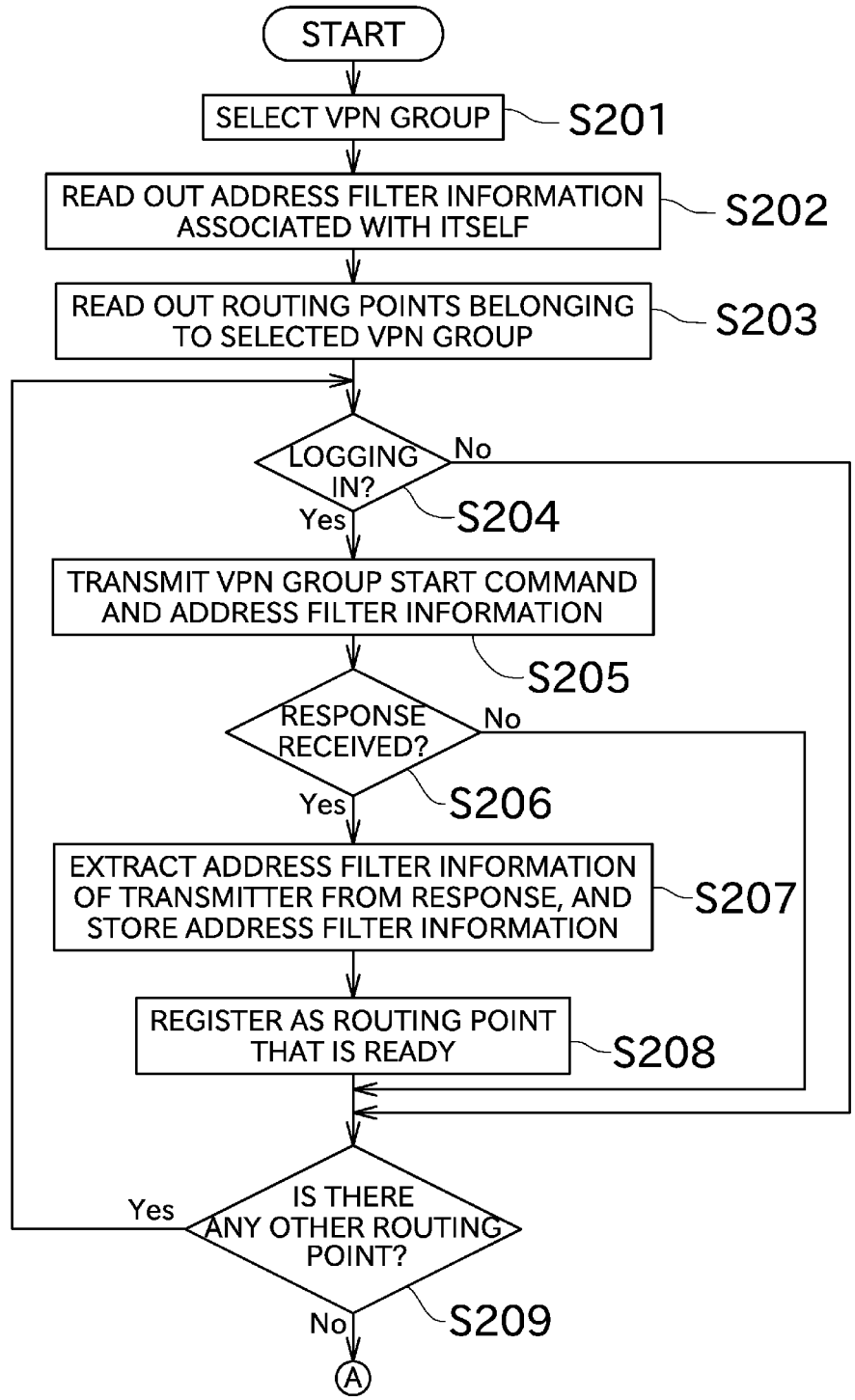
FIG. 13 is a flowchart showing a process of starting a VPN based on VPN group information according to a preferred embodiment of the present invention.
Figure 14:
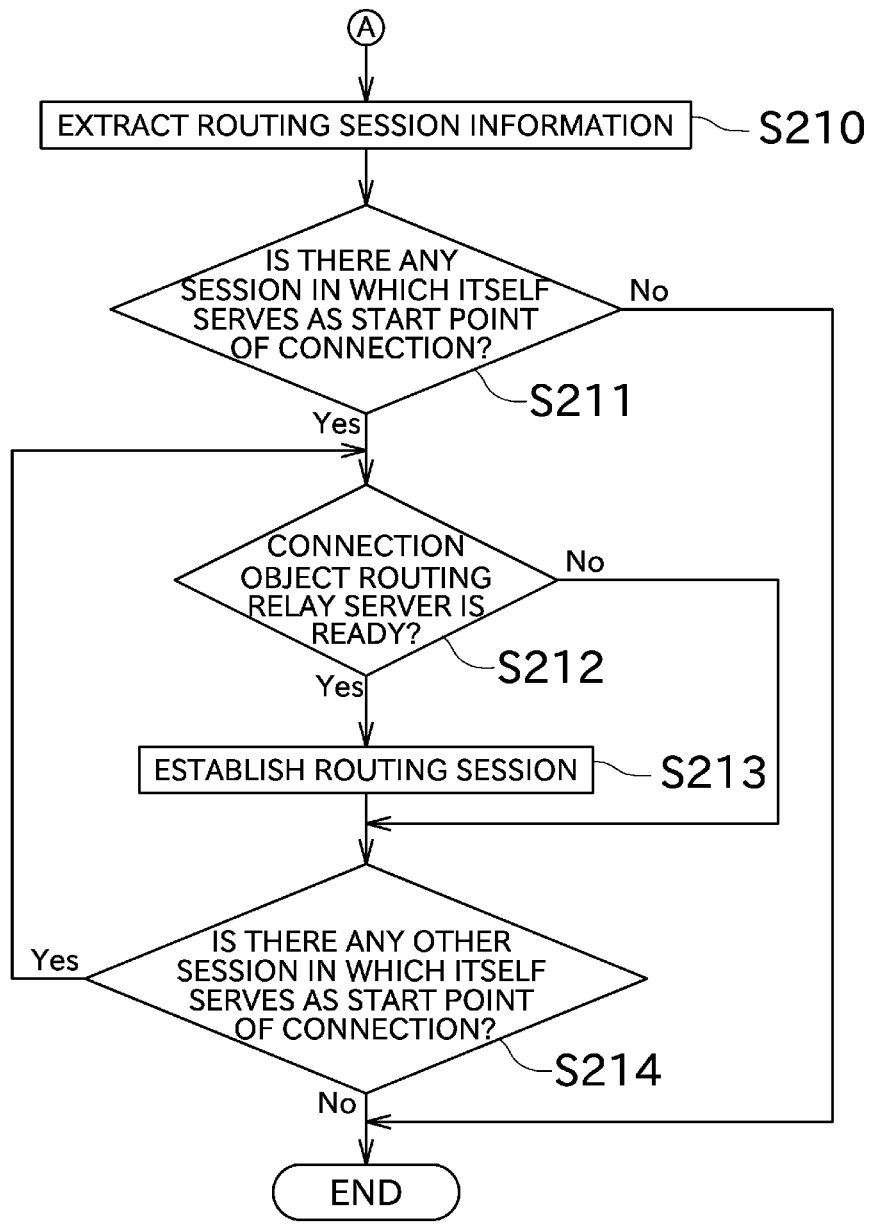
FIG. 14 is a flowchart showing the process of starting a VPN based on VPN group information according to a preferred embodiment of the present invention.

Next, with reference to FIGS. 13 and 14, a description will be given to a process to start the VPN based on the VPN group information thus built. FIGS. 13 and 14 illustrate a flowchart showing a process to start the VPN based on the VPN group information.

For example, the user logs in to the relay server 3 from the client terminal 39, and displays a list of made VPN groups on the client terminal 39. Then, the user selects an appropriate VPN group from these VPN groups (S201), to cause the relay server 3 to perform the process to start the VPN. In the illustration herein, it is assumed that the user selects the VPN-GROUP2.

In, for example, selecting the VPN group, it is possible to select whether or not to set the terminal from which the login is made as the sub routing point in the relay server 3 serving as the login destination. In a case where the user selects to set, as the sub routing point, the terminal (here, the client terminal 39) from which the login is made, the identification information of the client terminal 39, and the like, is added to the sub routing point information and the sub routing session information in the content stored in the sub VPN group information storage unit 55 included in the relay server 3.

Then, the relay server 3 reads out the address filter information concerning the relay server 3 (S202). The address filter information concerning the relay server 3 is the IP address of the file server 31. Then, the relay server 3 reads out the routing point belonging to the selected VPN group (S203). As a result, based on the content of the VPN group information shown in FIG. 6B, the identification information of the relay server 2 is read out.

The relay server 3 first determines whether or not the relay server 2 is currently logging in (whether "stat" is active or blank), based on the relay server information (S204). The relay server information shown in FIG. 4 indicates that the relay server 2 is currently logging in to the relay communication system 100. Therefore, the relay server 3 transmits a VPN-group start command to the relay server 2 (Sequence Number 3: startVpn in FIG. 12). At this time, simultaneously, the identification information (VpnGroupID) of the selected VPN group and the address filter information (addr03) concerning the relay server 3, are also preferably transmitted to the relay server 2.

This enables the relay server 2 to identify the VPN group for which a start process should be performed and to obtain the latest address filter information concerning the relay server 3. The relay server 2 notifies the relay server 3 that the relay server 2 has received the signal, and transmits the address filter information (addr02) concerning the relay server 2 to the relay server 3 (S205). Upon reception of a response from the relay server 2 (S206), the relay server 3 stores the received address filter information into the address filter information storage unit 57 (S207). Also, the relay server 3 registers the relay server 2 as a routing point that has been ready for starting the VPN (S208).

In this manner, in starting a VPN, each of the routing relay servers is able to exchange (obtain) the address filter information with the other routing relay servers, and therefore the VPN can be built with use of the latest address filter information. Accordingly, even in a case where the address filter information concerning a portion of the routing relay servers has been changed before the VPN is started, the VPN can be started under a state where such a change is reflected in all the routing relay servers. This can prevent occurrence of inconsistency in the routing of a packet, and can improve the reliability.

Then, the relay server 3 determines whether or not there is any other routing point (S209). As shown in FIG. 6B, only the relay server 3 and the relay server 2 serve as the routing points in the VPN-GROUP2, and no other routing points are described. Therefore, the relay server 3 extracts the routing session information 543 from the content stored in the VPN group information storage unit 54 (S210).

Then, the relay server 3 refers to the extracted routing session information, to determine whether or not a routing session in which the relay server 3 serves as a start point is described therein (S211). The routing session information 543 shown in FIG. 6B describes that the relay server 3 serves as a start point in a routing session established between the relay server 3 and the relay server 2.

Accordingly, the relay server 3 determines whether or not the relay server 2 is a routing point that has been ready for starting the VPN (S212). Since the relay server 2 has been registered as being ready in S208 mentioned above, the relay server 3 performs a communication control on the relay server 2, to establish a routing session (S213; Sequence Number 4: createVpnSsn in FIG. 12).

Then, the relay server 3 determines whether or not any other routing session in which the relay server 3 serves as a start point of connection is described (S214). As shown in FIG. 6B, the routing session information does not describe any routing session in which the relay server 3 serves as a start point, except for the routing session with the relay server 2. Therefore, this series of processing is terminated.

The process of starting the VPN in accordance with a preferred embodiment of the present invention is preferably performed in the manner thus far described. Each of the routing relay servers does not perform an initial communication control to establish a routing session unless it is described in the routing session information that the routing relay server should be a start point. This can prevent collision of the communication control, and can establish a routing session between apparatuses through a simple control.

In a case where the VPN group is changed while the VPN is running, the fact that the change has been made is notified to the respective routing relay servers, and appropriate information is updated. Then, based on the updated information, communication through the VPN is performed. This enables the VPN group to be changed without stopping the VPN.

Figure 15:
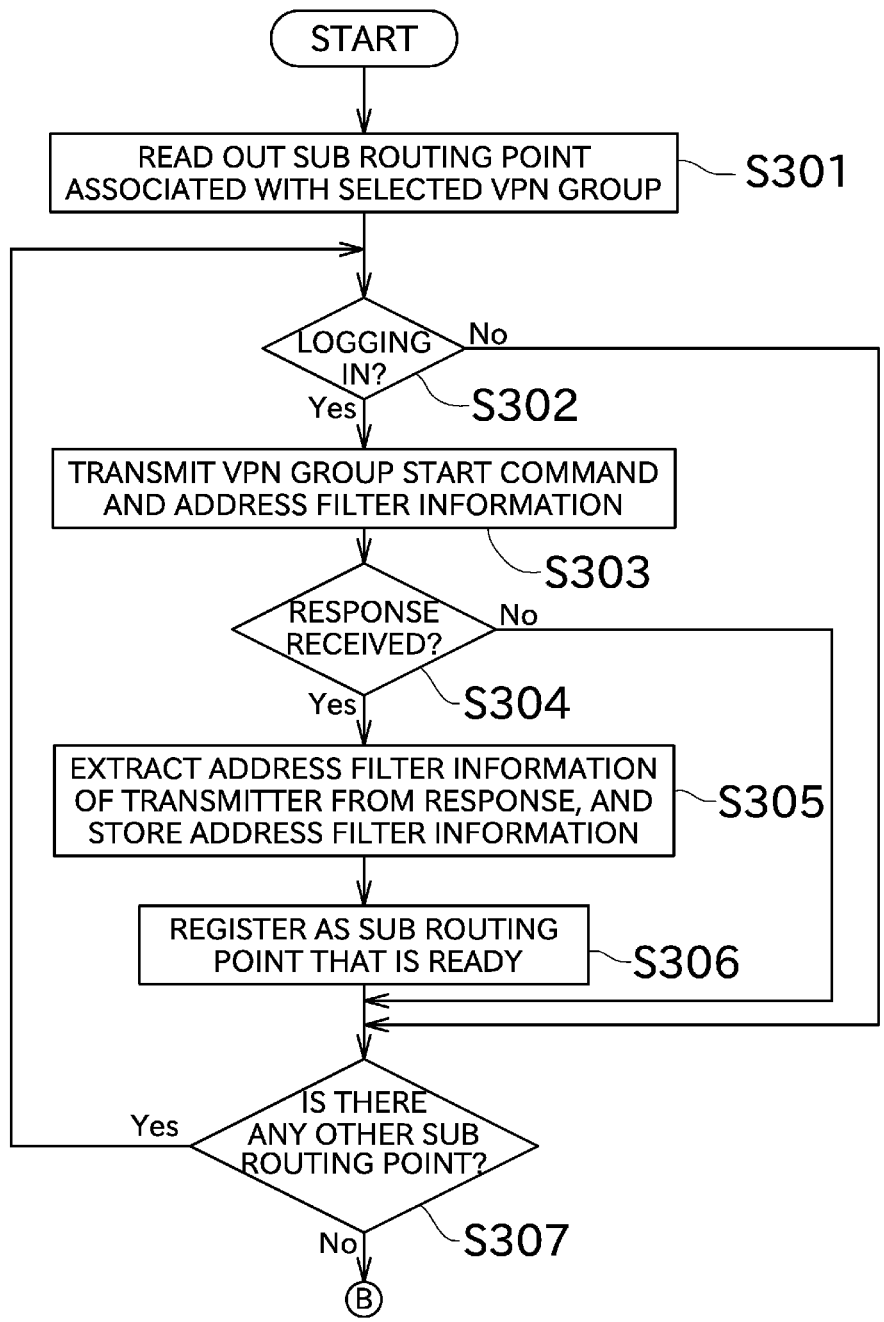
FIG. 15 is a flowchart showing a process of starting a VPN based on sub VPN group information according to a preferred embodiment of the present invention.
Figure 16:
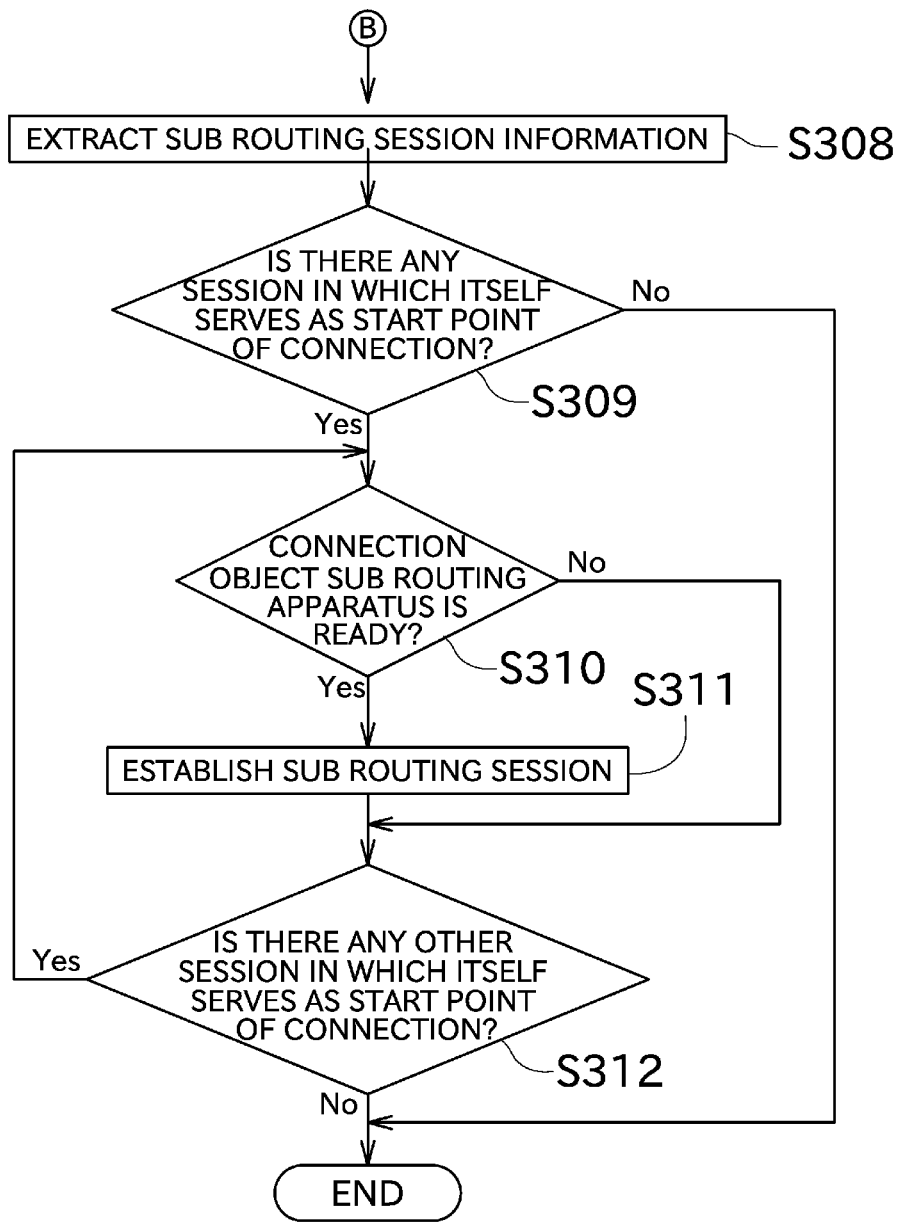
FIG. 16 is a flowchart showing the process of starting a VPN based on sub VPN group information according to a preferred embodiment of the present invention.

Next, with reference to FIGS. 15 and 16, a description will be given to a process to start the VPN based on the sub VPN group information. FIGS. 15 and 16 illustrate a flowchart showing a process to start the VPN based on the sub VPN group information. The process shown in FIGS. 15 and 16 is performed at a proper timing concurrently with the process shown in FIGS. 13 and 14. In the process shown in FIGS. 15 and 16, processing equivalent to that of the process shown in FIGS. 13 and 14 is preferably often performed, and therefore a description thereof may be simplified or omitted.

Firstly, the relay server 3 refers to the sub routing point information, to read out the sub routing point associated with the VPN group selected in S201 (S301). As shown in FIG. 7A, in VPN-GROUP2, the client terminal 37 is described as the client terminal that is set as the sub routing point of the relay server 3. Therefore, the client terminal 37 is read out. As described above, the client terminal 37 is able to behave as if it is a routing point that forwards a packet, similarly to the routing relay servers (the relay server 2 and the relay server 3). To achieve this function, the client terminal 37 includes an appropriate storage unit configured to store the address filter information, the routing session information, and the like, a control unit having the same configuration as that of the control unit 60 shown in FIG. 2, and an interface portion having the same configuration as that of the interface unit 70 shown in FIG. 2, though details thereof are not shown.

After S301, the relay server 3 determines whether or not the client terminal 37 that has been read out is currently logging in (whether the identification information of the relay server is described in "site", or the "site" is blank) based on the relay server information (S302). Since the relay server information shown in FIG. 4 indicates that the client terminal 37 is currently logging in, the relay server 3 transmits the VPN-group start command to the client terminal 37 (S303; Sequence Number 5: startVpn in FIG. 12). At this time, simultaneously, the identification information of the selected VPN group and the address filter information (addr02 and addr03) stored in the relay server 3 as described above are also transmitted. In this manner, the client terminal 37 can obtain the latest address filters of the relay server 2 and the relay server 3.

The client terminal 37 notifies the relay server 3 that the client terminal 37 has received the signal, and transmits address filter information (addr37) stored in the storage unit of the client terminal 37 to the relay server 3. This address filter information is address filter information concerning the client terminal 37, which is appropriately set such that the client terminal 37 is able to forward a packet to the file server 38 when the client terminal 37 operates as a sub routing point. Accordingly, in the client terminal 37, the IP address (which corresponds to the address filter information) of the file server 38 is stored in association with the identification information of the client terminal 37.

Upon reception of a response from the client terminal 37 (S304), the relay server 3 stores the address filter information concerning the client terminal 37 into the address filter information storage unit 56 and the sub address filter information storage unit 57 (S305). As described above, in the address filter information storage unit 56, the address filter information of the client terminal 37 (the IP address of the file server 38) is stored in association with the identification information of the relay server 3 as shown in FIG. 9, while in the sub address filter information storage unit 57, the address filter information of the client terminal 37 (the IP address of the file server 38) is stored in association with the identification information of the client terminal 37 as shown in FIG. 10. The relay server 3 transmits the address filter information concerning the client terminal 37 to the other routing relay servers (relay server 2) (Sequence Number 6: send(addr37) in FIG. 12). The relay server 2 additionally stores the received address filter information concerning the client terminal 37 into the address filter information storage unit 56, in association with the identification information of the relay server 3 (however, the content stored in the sub address filter information storage unit 57 is not updated).

Then, the relay server 3 registers the client terminal 37 as a sub routing point that has been ready to start the VPN (S306).

Then, the relay server 3 determines whether or not there is any other sub routing point (S307). As shown in FIG. 7A, preferably only the client terminal 37 serves as the sub routing point in the VPN-GROUP2, and no other sub routing points are described. Therefore, the relay server 3 extracts the sub routing session information from the content stored in the sub VPN group information storage unit 55 (S308). Here, if the user has selected to set the client terminal 39 as the sub routing point at a time of starting the VPN, the relay server 3 preferably performs the processing of S302 to S306 with respect to the client terminal 39, too.

Then, the relay server 3 refers to the extracted sub routing session information, to determine whether or not a sub routing session in which the relay server 3 serves as a start point is described (S309). The sub routing session information shown in FIG. 7B describes that the relay server 3 serves as a start point in a sub routing session established between the relay server 3 and the client terminal 37.

Therefore, the relay server 3 determines whether or not the client terminal 37 is a sub routing point that has been ready for starting the VPN (S310). Since the client terminal 37 has been registered as being ready in S306 mentioned above, the relay server 3 performs a communication control on the client terminal 37, for establishing a sub routing session (S311; Sequence Number 7: createVpnSsn in FIG. 12).

Then, the relay server 3 determines whether or not any other sub routing session in which the relay server 3 serves as a start point of connection is described (S312). The sub routing session information shown in FIG. 7B does not describe any sub routing session in which the relay server 3 serves as a start point of connection, except for the sub routing session with the client terminal 37, which has been already established. Therefore, this series of processing is terminated.

In the manner thus far described, the process of starting the VPN based on the sub VPN group information can be performed. If the user has selected to put the client terminal 39 into the sub VPN group at a time of starting the VPN, the relay server 3 performs the sub routing session establishment process, and the like, with the client terminal 39.

Next, a description will be given to a case where the sub routing point is changed while the VPN is running. For example, a case will be considered in which, in a situation where the relay server information preliminarily describes that the client terminal 42 shown in FIG. 1 belongs to the relay server 3 though it is not described in the relay server information shown in FIG. 4, the client terminal 42 is added as a sub routing point of the VPN while the VPN (VPN-GROUP2) is running. In this case, the relay server 3 preferably adds the identification information of the client terminal 42 to the sub routing point information and the sub routing session information, and updates the content stored in the sub VPN group information storage unit 55. Then, the relay server 3 receives the address filter information concerning the client terminal 42 from the client terminal 42, and stores the received address filter information into the address filter information storage unit 56 and the sub address filter information storage unit 57.

Here, the address filter information concerning the client terminal 42 is appropriately set in advance such that the client terminal 42 is able to forward a packet to the file server 43 when the client terminal 42 operates as a sub routing point. Accordingly, the address filter information transmitted from the client terminal 42 to the relay server 3 is the IP address of the file server 43, which is stored in the address filter information storage unit 56 and the sub address filter information storage unit 57. Thus, a sub routing session is established between the relay server 3 and the client terminal 42.

Then, the relay server 3 notifies the other routing relay servers (relay server 2) of the address filter information concerning the client terminal 42. The relay server 2 having received this notification stores the address filter information concerning the client terminal 42 (that is, the IP address of the file server 43) into the address filter information storage unit 56, in association with the identification information of the relay server 3 (however, the content stored in the sub address filter information storage unit 57 is not updated). Through the above-described processing, a change of the sub routing point is completed, and subsequently the VPN communication can be performed in the same manner as before the change.

Thus, even in a case where the sub routing point belonging to the relay server 3 is changed, it suffices that the relay server 2 updates only the content stored in the address filter information storage unit 56. It is not necessary to update any of the contents stored in the VPN group information storage unit 54, the sub VPN group information storage unit 55, and the sub address filter information storage unit 57. Moreover, the necessary change of the content stored in the address filter information storage unit 56 is merely a change of a VPN communication partner caused as a result of the change of the sub routing point (in the above-described example, merely by adding the IP address of the file server 43). Thus, even in a case where the sub routing point is changed in a certain routing relay server, its influence on the contents stored in the other routing relay servers can be considerably reduced. Accordingly, the configuration of this preferred embodiment of the present invention is particularly suitable in a case where the sub routing point is frequently changed, and extremely facilitates an expeditious operation in which, for example, a sub routing point is (e.g., temporarily) added by using the opportunity to start the VPN as described above. The change of the sub routing point is not limited to addition of a client terminal as described above, and needless to say, may be deletion of the existing sub routing point, too.

Figure 17:
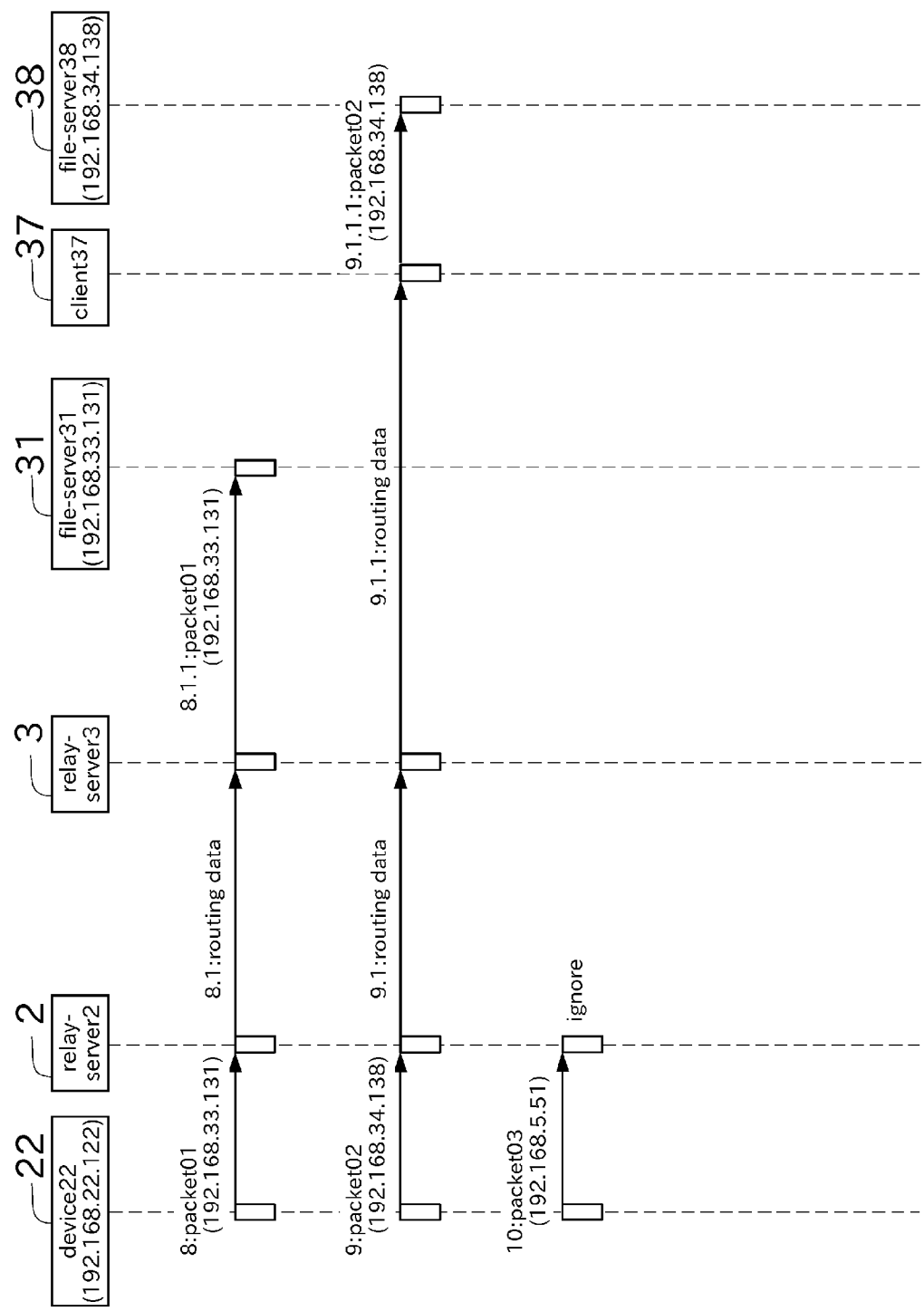
FIG. 17 is a sequence diagram showing a communication process of performing routing of a packet according to a preferred embodiment of the present invention.

Next, a process to perform routing a packet by using the established routing session will be described mainly with reference to FIG. 17. FIG. 17 is a sequence diagram showing a communication process to perform routing of a packet. In the following, a description will be given to a case where the relay server 2 functioning as a routing point receives three kinds of packets, namely, a first packet to a third packet.

Firstly, a case will be described where a first packet whose destination has an IP address of (192.168.33.131) is received (Sequence Number 8: packet01). The relay server 2, after receiving this first packet, compares the IP address of the destination against the content stored in the address filter information storage unit 56 (see FIG. 9). Then, the relay server 2 detects a routing point that is able to transmit a packet to the destination indicated in the first packet.

As shown in FIG. 17, the IP address of the destination of the first packet is included in the address filter information associated with the identification information of the relay server 3. As a result, the relay server 2 transmits the first packet to the relay server 3 via the routing session established with the relay server 3.

The relay server 3 having received the first packet compares the IP address of the destination against the content stored in the address filter information storage unit 56 (see FIG. 9). Then, the relay server 3 detects that the relay server 3 is described as a routing point that is able to transmit a packet to the destination indicated in the first packet. Then, the relay server 3 compares the IP address of the destination against the content stored in the sub address filter information storage unit 57 (see FIG. 10), and detects that no sub routing point that is able to transmit a packet to the destination indicated in the first packet is set. As a result, the relay server 3 transmits the first packet to the file server 31 that is the destination.

Next, a case will be described where a second packet whose destination has an IP address of (192.168.34.138) is received by the relay server 2 (Sequence Number 9: packet02). In the content stored in the address filter information storage unit 56 (see FIG. 9), the relay server 3 is designated as a routing point that is able to transmit a packet to the destination indicated in the second packet, similarly to the first packet. Accordingly, the relay server 2 transmits the second packet to the relay server 3 via the routing session established with the relay server 3.

The relay server 3 having received the second packet compares the IP address of the destination against the content stored in the address filter information storage unit 56 (see FIG. 9), and detects that the relay server 3 is described as a routing point that is able to transmit a packet to the destination indicated in the second packet. Then, the relay server 3 compares the IP address of the destination against the content stored in the sub address filter information storage unit 57 (see FIG. 10), and detects that the client terminal 37 is described as a sub routing point that is able to transmit a packet to the destination indicated in the second packet. As a result, the relay server 3 transmits the second packet to the client terminal 37 via the sub routing session established with the client terminal 37.

The client terminal 37 having received the second packet operates similarly to the relay server 3. To be specific, the client terminal 37 refers to the address filter information concerning itself, which is stored in the storage unit included in the client terminal 37. Then, the client terminal 37 detects that, in this address filter information, the client terminal 37 is described as a routing point that is able to transmit a packet to the destination indicated in the second packet. As a result, the client terminal 37 transmits the second packet to the file server 38 that is the destination.

Next, a case will be described where a third packet whose destination has an IP address of (192.168.5.51) is received by the relay server 2 (Sequence Number 10: packet03). The relay server 2 compares the IP address of the destination against the address filter information, and consequently detects that no routing point that is able to transmit a packet to the destination is described. In this case, the relay server 2 does not transmit the received third packet to anywhere.

Thus, in this preferred embodiment of the present invention, routing object data is fed through a routing session at an application layer. Therefore, the above-described routing is different from an ordinary IP routing.

In this manner, routing at the application layer allows LANs in distant places to communicate with each other by using the private IP addresses without regard to a WAN. Additionally, as described above, the address filter information storage unit 56 can display the name of a partner that can be designated as the destination of a packet. This enables the user to easily recognize an apparatus to which the packet can be transmitted by using the VPN.

Figure 18:
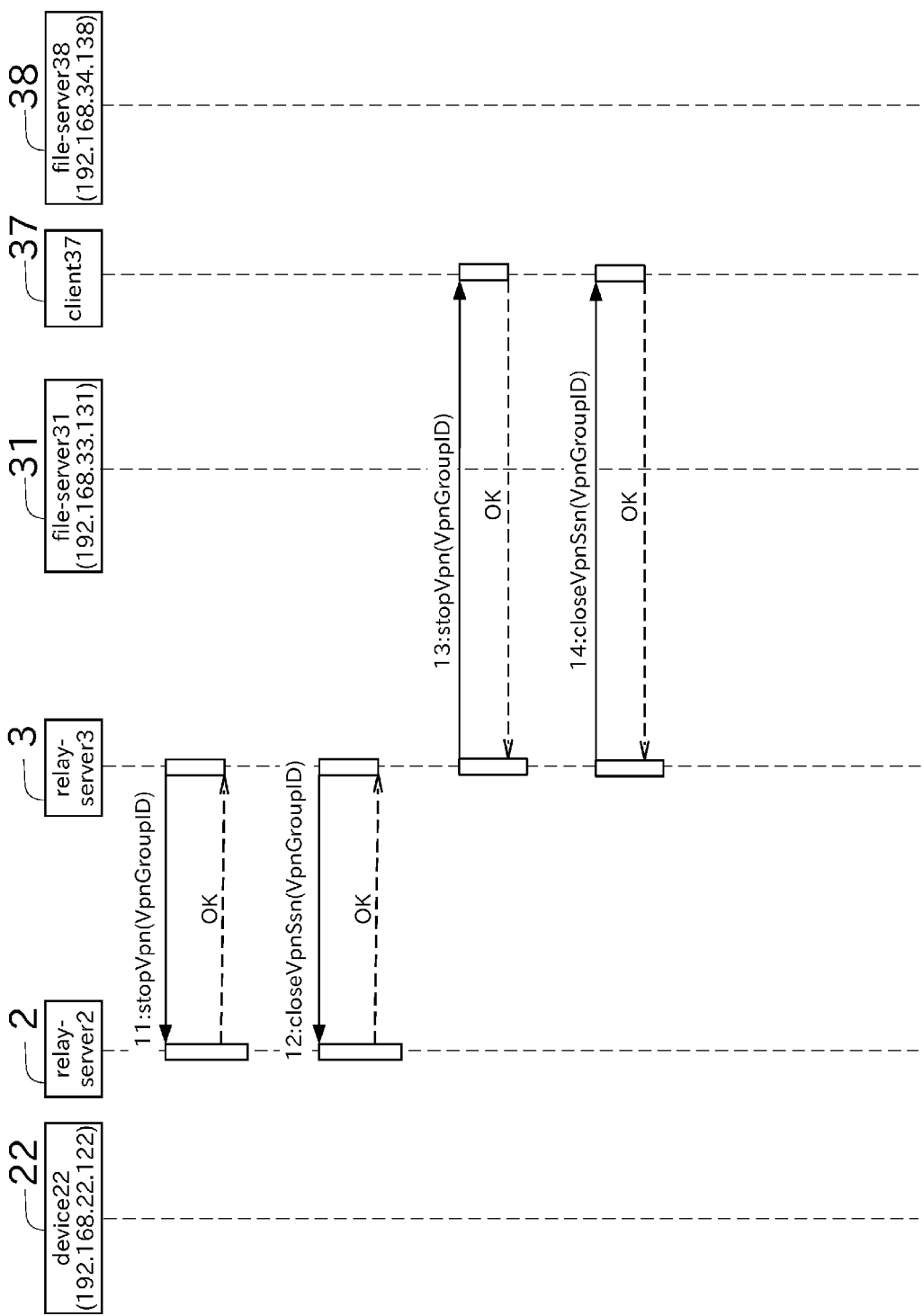
FIG. 18 is a sequence diagram showing a communication process of terminating a VPN according to a preferred embodiment of the present invention.

Next, a process to terminate the VPN will be described with reference to FIG. 18. FIG. 18 is a sequence diagram showing a communication process to terminate the VPN group. The user logs in to the relay server 3 via the client terminal 37, and performs a predetermined operation. As a result, the user can start a process of terminating the VPN. This description is based on the assumption that the relay server 3 starts the process to terminate the VPN via the client terminal 37.

Upon reception of an instruction to terminate the VPN, the relay server 3 transmits such a notification as well as the identification information of the VPN group to the relay server 2 (Sequence Number 11: stopVpn). The identification information of the VPN group received from the relay server 3 enables the relay server 2 to recognize the VPN group for which the VPN should be terminated.

The relay server 3 receives a signal indicating an acknowledgement of the termination of the VPN from the relay server 2, and then transmits a routing-session termination command to the relay server 2 (Sequence Number 12: closeVpnSsn).

Then, the relay server 3 transmits a signal indicating termination of the VPN to the client terminal 37, too (Sequence Number 13: stopVpn). Then, after receiving a response from the client terminal 37, the relay server 3 transmits the routing-session termination command (Sequence Number 14: closeVpnSsn).

As illustrated above, the relay server 3 of this preferred embodiment preferably includes the relay group information storage unit 51, the relay server information storage unit 52, the VPN group information storage unit 54, the sub VPN group information storage unit 55, the address filter information storage unit 56, the sub address filter information storage unit 57, and the communication control unit 63. The relay group information storage unit 51 stores relay group information concerning a relay group including other relay servers 1 and 2 that are mutually connectable with the relay server 3. The relay server information storage unit 52 stores relay server information including relay server start-up information, client terminal start-up information, and client terminal registration information. The relay server start-up information concerns the relay servers 1, 2, and 3 belonging to the relay group. The client terminal start-up information and the client terminal registration information concern the client terminals 11, 21, 37, and 39 that are connected to the relay servers 1, 2, and 3 belonging to the relay group. The VPN group information storage unit 54 relates to a VPN group configured to perform communication in a VPN via a routing session established among the routing relay servers. The VPN group information storage unit 54 is arranged and programmed to store the identification information of the routing relay servers included in the VPN group, and the routing session information indicating the routing relay servers that are connected to one another. The sub VPN group information storage unit 55 stores the sub VPN group information that includes the sub routing point information indicating the sub routing apparatus of the relay server 3. The address filter information storage unit 56 stores the address filter information concerning the routing relay server and the address filter information concerning the sub routing apparatus of this routing relay server in association with the identification information of this routing relay server. The sub address filter information storage unit 57 stores the address filter information concerning the client terminal 37 that is a sub routing apparatus of the relay server 3 in association with the identification information of the client terminal 37. The communication control unit 63 is arranged and programmed to perform a control to establish a routing session between the relay server 3 and another routing relay server; a control to establish a sub routing session between the relay server 3 and the client terminal 37; and a packet forward control to forward a received packet via the routing session or the sub routing session. The packet forward control is such a control that, when the destination of a packet is associated with the sub routing apparatus of the relay server 3 in the content stored in the sub address filter information storage unit 57, the packet is forwarded to the sub routing apparatus, while otherwise the packet is forwarded to the destination.

This enables the relay server 3 to build a VPN with another routing relay server and, for example, share a file only with a necessary apparatus. The above-described configuration can simplify the VPN group information as compared with a VPN in which a client terminal in addition to a relay server functions as a routing point. Moreover, in the address filter information storage unit 56, the address filter information concerning a sub routing apparatus is stored, not in association with the identification information of this sub routing apparatus, but in association with the identification information of the routing relay server. Accordingly, even in a network including a large number of sub routing points, complication of the content stored in the address filter information storage unit can be significantly reduced or prevented. This significantly reduces the amount of information stored in the relay server. Furthermore, in a case of synchronizing the information with another routing relay server, the amount of information exchanged between the routing relay servers can be significantly reduced or prevented.

In the relay server 3 of this preferred embodiment of the present invention, when an instruction to set the client terminal 39 as a sub routing point of the relay server 3 as well as an instruction to start the VPN is received from the client terminal 39, the communication control unit 63 is arranged and programmed to perform a control to add the client terminal 39 to the sub VPN group information (more specifically, to the sub routing point information and the sub routing session information); a control to transmit the address filter information concerning the client terminal 39 to another routing relay server; and a control to establish a routing session between the relay server 3 and the client terminal 39.

This preferably makes it easy to set, as a sub routing point, the client terminal 39 having instructed to start the VPN.

In the relay server 3 of this preferred embodiment of the present invention, the sub routing point can be changed while the virtual private network is maintained.

This preferably makes it possible to build a VPN capable of flexibly dealing with a change in a status.

While preferred embodiments of the present invention have been described above, the above-described configurations can be changed, for example, as follows.

A format in which the above-described relay group information, relay server information, client terminal information, VPN group information, address filter information, and the like, are stored is not limited to XML format. These kinds of information can be stored in any appropriate format.

Instead of the configuration of the above-described preferred embodiments, a configuration is also acceptable in which an external server used for communication between relay servers is placed on the Internet and caused to exert a function as an SIP (Session Initiation Protocol) server, thus performing communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
a relay group information storage unit that stores relay group information concerning a relay group including another relay server that is mutually connectable with the relay server;
a relay server information storage unit that stores relay server information including relay server start-up information, client terminal start-up information, and client terminal registration information, the relay server start-up information concerning the relay server belonging to the relay group, the client terminal start-up information and the client terminal registration information concerning a client terminal that belongs to the relay server belonging to the relay group;
a VPN group information storage unit that relates to a VPN group including routing relay servers that are the relay servers being set as routing points among the relay servers included in a relay communication system based on the relay group information and the relay server information, the VPN group being configured to perform communication in a virtual private network via a routing session established among the routing relay servers, the VPN group information storage unit storing identification information of the routing relay servers included in the VPN group and routing session information indicating the routing relay servers that are connected to one another;
a sub VPN group information storage unit that stores sub VPN group information that includes sub routing point information indicating a sub routing apparatus of the relay server, where the sub routing apparatus of a certain relay server represents a client terminal that is set as a sub routing point among client terminals belonging to the certain relay server;
an address filter information storage unit that stores address filter information concerning the routing relay server and address filter information concerning the sub routing apparatus of the routing relay server in association with identification information of the routing relay server, where the address filter information concerning a certain routing relay server or a certain sub routing apparatus represents information indicating an address of a routing object device that is designatable as a forwarding destination to which the certain routing relay server or the certain sub routing apparatus is able to forward a packet;
a sub address filter information storage unit that stores address filter information concerning the sub routing apparatus of the relay server in association with identification information of the sub routing apparatus; and
a communication control unit that is arranged and programmed to perform a control to establish a routing session between the relay server and the routing relay server, a control to establish a sub routing session between the relay server and the sub routing apparatus of the relay server; and a packet forward control to forward a received packet via the routing session or the sub routing session,
the packet forward control being a control that:
in a case where a destination of a packet received via the routing session is associated with the relay server in a content stored in the address filter information storage unit, or in a case where the destination of the packet is associated with the sub routing apparatus of the relay server in a content stored in the sub address filter information storage unit, the packet is forwarded to the sub routing apparatus, otherwise the packet is forwarded to the destination; wherein
in a case where an instruction to set the client terminal belonging to the relay server as a sub routing point as well as an instruction to start a virtual private network is received from the client terminal, the communication control unit is arranged and programmed to perform a control to add the client terminal having instructed to start the virtual private network to the sub VPN group information; a control to transmit the address filter information concerning the client terminal to another routing relay server; and a control to establish the sub routing session between the relay server and the client terminal.

2. The relay server according to claim 1, wherein the sub routing point is changeable while the virtual private network is maintained.

3. A relay communication system comprising:
a plurality of relay servers; and
client terminals that are connectable with each other via the relay servers; wherein each of the relay server includes:
a relay group information storage unit that stores relay group information concerning a relay group including another relay server that is mutually connectable with the relay server;
a relay server information storage unit that stores relay server information including relay server start-up information, client terminal start-up information, and client terminal registration information, the relay server start-up information concerning the relay server belonging to the relay group, the client terminal start-up information, and the client terminal registration information concerning a client terminal;

a VPN group information storage unit that relates to a VPN group including routing relay servers that are the relay servers being set as routing points among the relay servers, the VPN group being configured to perform communication in a virtual private network via a routing session established among the routing relay servers, the VPN group information storage unit storing identification information of the routing relay servers included in the VPN group and routing session information indicating the routing relay servers that are connected to one another;

a sub VPN group information storage unit that stores sub VPN group information that includes sub routing point information indicating a sub routing apparatus of the relay server, where the sub routing apparatus of the relay server represents the client terminal that is set as a sub routing point among client terminals belonging to the relay server;

an address filter information storage unit that stores address filter information concerning the routing relay server and address filter information concerning the sub routing apparatus of the routing relay server in association with identification information of the routing relay server, where the address filter information concerning a certain routing relay server or a certain sub routing apparatus represents information indicating an address of a routing object device that is designatable as a forwarding destination to which the certain routing relay server or the certain sub routing apparatus is able to forward a packet;

a sub address filter information storage unit that stores address filter information concerning the sub routing apparatus of the relay server in association with identification information of the sub routing apparatus; and a communication control unit that is arranged and programmed to perform a control to establish a routing session with another routing relay server; a control to establish a sub routing session between the relay server and the sub routing apparatus; and a packet forward control to forward a received packet via the routing session or the sub routing session, the packet forward control being a control that:

in a case where a destination of a packet received via the routing session is associated with the relay server in a content stored in the address filter information storage unit or in a case where the destination of the packet is associated with the sub routing apparatus of the relay server in a content stored in the sub address filter information storage unit, the packet is forwarded to the sub routing apparatus, otherwise the packet is forwarded to the destination; wherein in a case where an instruction to set the client terminal belonging to the relay server as a sub routing point as well as an instruction to start a virtual private network is received from the client terminal, the communication control unit is arranged and programmed to perform a control to add the client terminal having instructed to start the virtual private network to the sub VPN group information; a control to transmit the address filter information concerning the client terminal to another routing relay server; and a control to establish the sub routing session between the relay server and the client terminal.

* * * * *